United States Patent [19]
Bevan et al.

[11] Patent Number: 5,846,041
[45] Date of Patent: Dec. 8, 1998

[54] NONROTATING, SELF-CENTERING ANCHOR ASSEMBLY FOR ANCHORING A BOLT IN A BOREHOLE

[75] Inventors: John E. Bevan; Grant W. King, both of Spokane, Wash.

[73] Assignee: The United States of America as represented by the United States Department of Energy, Washington, D.C.

[21] Appl. No.: 891,069

[22] Filed: Jul. 10, 1997

[51] Int. Cl.⁶ ............................. F16B 13/04; F16B 13/06
[52] U.S. Cl. ............................. 411/65; 411/50; 411/72; 411/77
[58] Field of Search ............................. 411/50, 51, 55, 411/60, 64, 65, 66, 72, 73, 77

[56] References Cited

U.S. PATENT DOCUMENTS

| | | | |
|---|---|---|---|
| 4,602,902 | 7/1986 | Herb | 411/65 X |
| 4,861,198 | 8/1989 | Stankus | 411/65 X |
| 5,018,908 | 5/1991 | Laphon | 411/64 X |
| 5,094,577 | 3/1992 | Clark et al. | 411/55 X |
| 5,219,248 | 6/1993 | Wright | 411/65 X |

*Primary Examiner*—Neill R. Wilson
*Attorney, Agent, or Firm*—Mark LaMarre; Mark P. Dvorscak; William R. Moser

[57] ABSTRACT

An expandable anchor assembly is provided for anchoring the threaded end portion of an elongated roof bolt in a borehole. The anchoring assembly includes a hollow outer sleeve in the form of a plurality of symmetrically arranged, longitudinal segmented wall portions with exterior gripping teeth and an inner expander sleeve in the form of a corresponding plurality of longitudinal wall portions symmetrically arranged about a central axis to define an inner threaded cylindrical section. The inner sleeve is captured within and moveable axially relative to the outer sleeve. As the threaded end portion of the elongated bolt is inserted into the inner threaded cylindrical section of the inner sleeve from the trailing end to the leading end thereof, the inner sleeve expands over and clamps around the threaded end portion of the elongated bolt. Thereafter, partial withdrawal of the elongated bolt from the borehole causes the inner sleeve to axially move relative to the outer sleeve from the leading end toward the trailing end of the outer sleeve in a wedging action to cause the outer sleeve to radially expand and force engagement of the gripping teeth against the sidewall of the borehole to thereby secure the expandable anchor assembly and therewith the threaded end portion of the elongated bolt within the borehole.

14 Claims, 3 Drawing Sheets

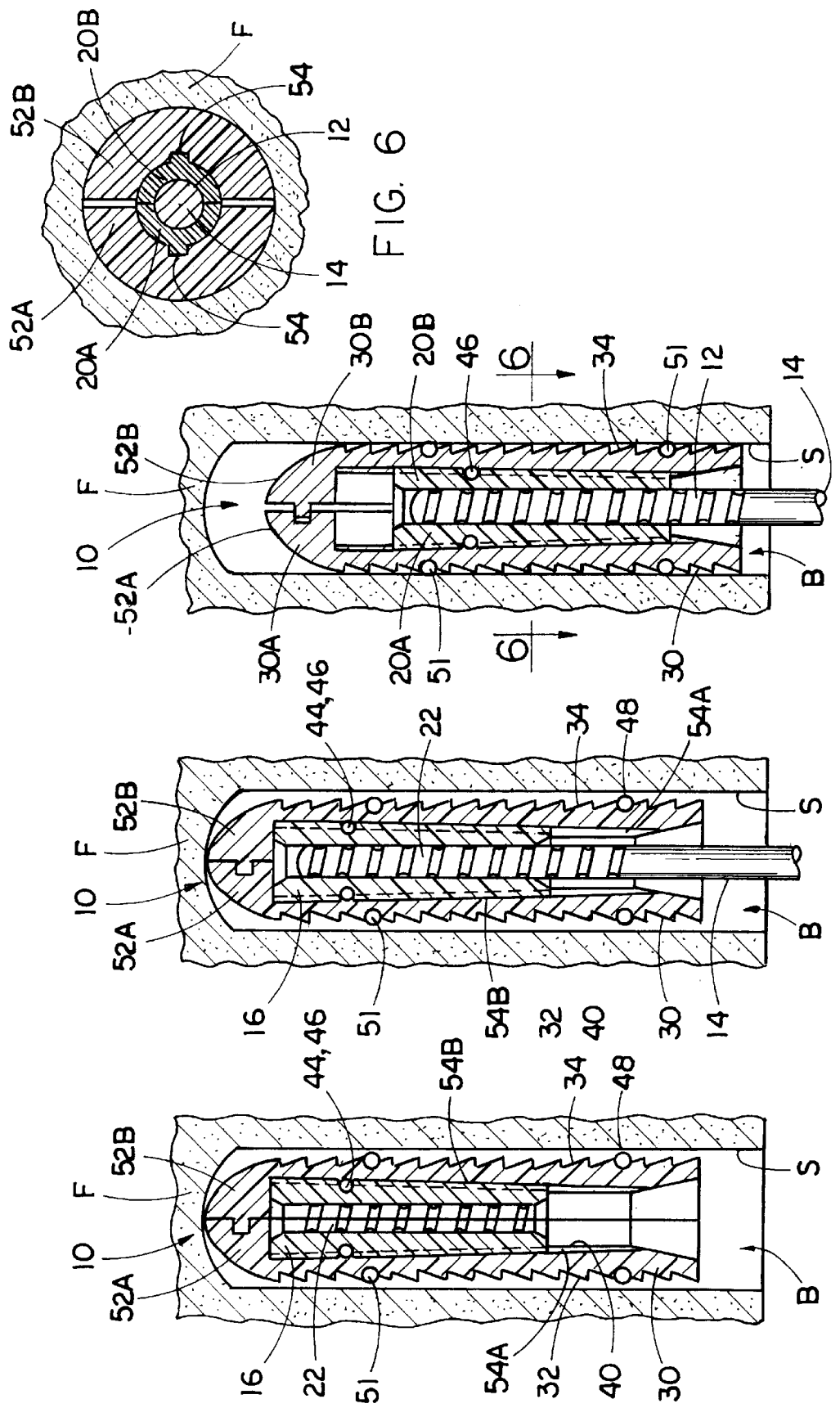

NONROTATING, SELF-CENTERING ANCHOR ASSEMBLY FOR ANCHORING A BOLT IN A BOREHOLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to an anchor assembly for anchoring bolts and, more particularly, to a self-centering anchor assembly wherein the threaded end portion of a bolt positioned in a borehole drilled in a rock formation is anchored in the borehole by mechanical expansion of the anchor assembly through tensioning of the bolt rather than through rotation.

2. Description of the Prior Art

It is a well established practice in underground mining work, such as coal mining, tunnel excavation, or the like, to reinforce or support the roof of the mine to prevent rock falls or cave-ins. The most common means presently used to support a mine roof is an elongated bolt or bar (commonly referred to as a roof bolt) which is inserted into the rock formation above the mine roof in a borehole and which is securely fixed in the borehole by anchoring means such as a mechanical anchor, a quick-setting resin which surrounds the end of the bolt within the hole, or both. The roof bolt, often placed under tension, is used to hold a metal support plate in close engagement with the roof.

The mechanical anchor type of roof bolt is well known and has been used for many years in supporting mine roofs. Such roof bolts typically include an elongated bolt which has a head on one end and is threaded on its opposite end. A radially expanding gripping member, referred to as an expansion sleeve or shell with exterior gripping teeth, and an internally threaded tapered nut, referred to as a spreader, is placed on the threaded end portion of the bolt and is inserted into a borehole drilled in the rock formation. Once the bolt is inserted into the borehole, so as to bring the bearing plate in contact with the roof, the bolt is spun until the gripping teeth make contact with the sidewall of the borehole or quick-setting resin cement is inserted in the borehole to prevent the expansion shell from rotating. Once the gripping teeth make contact with the sidewall of the hole or once the quick-setting resin has set, the bolt is then rotated further and because the expansion sleeve is constrained from rotating, the spreader nut is gradually drawn down into the expansion sleeve to cause radial expansion thereof and thereby forcing of the exterior gripping teeth to firmly engage the sidewall of the borehole. With the anchor firmly engaged within the borehole, the nut is further rotated to tension the elongated bolt to about one-half the yield strength of the bolt.

Initially, the roof bolt and its installation were designed to be installed by an operator manually using a rock drill, however, with the advancement of technology, automated roof bolting modules are being developed to further automate this operation. To make automated rock bolting simpler, an anchoring assembly to be used for anchoring the one end of the bolt in the borehole and then tensioning the bolt by a linear force rather than by rotation was needed and has been developed. Further, to add flexibility to this new machinery, it is desirable that the bolt and anchor assembly can be coupled almost any time during the bolting operation so as to allow freedom in designing different bolt assembly and insertion scenarios. Consequently, a need existed for an improved anchor assembly for anchoring one end of an elongated bolt in a borehole which is compatible with the requirements of this new automated rock bolting module.

SUMMARY OF THE INVENTION

The present invention is directed to an improved bolt anchor assembly designed to satisfy the aforementioned needs. The anchor assembly of the present invention operates on linear movement for bolt tensioning rather than rotational movement and thus well suited for the new automated bolting machines. The bullet-shaped nose of the anchor assembly of the present invention allows the anchor assembly to be inserted into a borehole without the need for extremely accurate positioning in meeting another desired feature of the automated bolting machines. The anchor assembly provides flexibility in designing different bolt assembly and insertion scenarios. For example, because the anchor assembly and the bolt can be coupled anywhere, even in the borehole, grouting the bolt is a simple inexpensive option. The anchor assembly can be pushed to the back of the hole and the hole backfilled with grout. The bolt is then pushed through the grout into the anchor assembly, after which it is engaged by tensioning the bolt. This is made possible, in part, because of the funnel shape features of the trailing end of the anchor assembly. Doing this with a conventional bolt and anchor would be virtually impossible because conventional bolt and anchor would displace the grout in the hole and blindly threading a bolt into a conventional anchor is not practical. Furthermore, since partial thread deformation does not restrict the performance of the anchor assembly of the present invention and no rotational force is required to tension a bolt, variable bolt lengths are feasible. Bolt material can be fed from a spool into a borehole, coupled with an anchor assembly, tensioned by linear force, secured by a collet, and cut to the desired length. The nonrotating, self-centering anchor assembly of the present invention has the potential to be used in a wide variety of situations since it allows for simplified anchor insertion and tensioning.

Accordingly, the present invention is directed to an expandable anchor assembly for insertion in a borehole drilled in a rock formation to anchor within the borehole a threaded end portion of an elongated bolt extending into the borehole. The anchoring assembly basically comprises: (a) a hollow inner expander sleeve having a wall with an inner threaded cylindrical section, the wall decreasing in thickness from a leading end to a trailing end of the inner sleeve to provide an outer surface tapering inwardly from the leading end to the trailing end, the inner sleeve in response to insertion of the threaded end portion of the elongated bolt into the inner threaded cylindrical section of the inner sleeve being operable to radially expand over and clamp around the threaded end portion of the elongated bolt such that the inner sleeve is axially movable with the bolt relative to the borehole; and (b) a hollow outer sleeve having a cylindrical outer surface and a wall increasing in thickness from a leading end to a trailing end of the sleeve to provide an inner surface tapering inwardly from the leading end to the trailing end, the outer sleeve having gripping teeth provided on the outer cylindrical surface of the outer sleeve, the inner expander sleeve being disposed within the outer sleeve with the inwardly tapered inner surface of the outer sleeve overlying the inwardly tapered outer surface of the inner sleeve and the inner sleeve being axially moveable relative to the outer sleeve, the outer sleeve in response to axial movement of the inner sleeve from the leading end toward the trailing end of the outer sleeve being operable to expand radially outwardly causing the gripping teeth thereon to grip a sidewall of the borehole. Once the threaded end portion of the elongated bolt is inserted into the inner threaded cylindrical section of the inner sleeve from the trailing end to the leading end thereof such that the inner sleeve has expanded over and clamped around the threaded end portion of the elongated bolt, then thereafter at least the partial withdrawal of the elongated bolt from the borehole causes the inner sleeve to axially move relative to the outer sleeve from the leading end toward the trailing end of the outer sleeve and thereby cause radial expansion of the outer sleeve and engagement of the gripping teeth of the outer sleeve with the sidewall of the borehole to thereby secure the expandable anchor assembly and therewith the threaded end portion of the elongated bolt within the borehole.

More particularly, the outer sleeve of the expandable anchor assembly includes a plurality of longitudinal segmented wall portions symmetrically arranged about a longitudinally extending central axis; and means for yieldably retaining the plurality of longitudinal segmented wall portions such that the outer sleeve retains and captures the inner expander sleeve therewithin as the expandable anchor assembly is inserted into the borehole but permits the segmented wall portions to expand radially outwardly from the central axis causing the gripping teeth on the outer surface of the outer sleeve to engage the sidewall of the borehole as the inner sleeve moves axially within the outer sleeve as the elongated bolt is partially withdrawn from the borehole. Preferably, the means for yieldably retaining the plurality of outer sleeve segmented wall portions includes at least one circumferential groove provided in the outer surface of the outer sleeve wall portions and a passive restraining device, such as an O-ring, of a yieldable material surrounding the plurality of segmented wall portions and disposed in the circumferential groove. In the preferred embodiment, a second O-ring is used to increase the diameter of the outer sleeve to thereby assist in initially setting the anchor assembly within the borehole.

The inner expander sleeve of the expandable anchor assembly also includes a plurality of longitudinal segmented wall portions symmetrically arranged about a longitudinally extending central axis in defining the inner threaded cylindrical section; and means for yieldably retaining the plurality of longitudinal segmented wall portions such that the inner sleeve, in response to insertion of the threaded end portion of the elongated bolt into the inner threaded cylindrical section, radially expands over and clamps around the threaded end portion of the elongated bolt and is movable axially with the bolt relative to the borehole. In like fashion, the means for yieldably retaining the plurality of inner sleeve segmented wall portions includes at least one circumferential groove provided in the outer surface of the inner sleeve wall portions and a passive restraining device, such as an O-ring, of a yieldable material surrounding the plurality of segmented wall portions and disposed in the circumferential groove.

In a preferred embodiment, the outer sleeve and the inner sleeve each includes a pair of arcuate-shaped wall portions composed of a plastic material with each outer sleeve wall portion having a half-cylinder configuration and with each inner sleeve wall portion having a configuration of a truncated cone cut in half lengthwise, whereas, in an alternative embodiment, the wall portions of the outer and inner sleeves are composed of cast iron with each outer sleeve wall portion having a crescent-shaped wedge configuration and with each inner sleeve wall portion having a configuration of a cylindrical wedge cut in half lengthwise. In the alternative cast iron embodiment, the means for yieldably retaining the outer sleeve wall portions is in the form of a U-shape strip of spring steel material with one wall portion attached to each opposite end of the strip of material and a plastic or and elastic restraining hoop that encircles the trailing end of the outer sleeve wall portions.

The expandable anchor assembly of the present invention further comprises a domed nose formed on the leading end of the outer sleeve so as to provide a bullet-shaped configuration for the expandable anchor assembly to guide and center the assembly within the borehole upon insertion thereof. For annular location of the inner sleeve within the outer sleeve and to prevent rotation of the inner sleeve relative to the outer sleeve as the inner sleeve is axially moved relative to the outer sleeve to cause radial expansion of the outer sleeve and thereby gripping engagement of the gripping teeth against the sidewall of the borehole, a location key that mates with a corresponding location keyway has been included in the anchor assembly. The location keyway is provided on one of the outer surface of the inner sleeve and the inner surface of the outer sleeve and the corresponding location key is provided on the other one of the outer surface of the inner sleeve and the inner surface of the outer sleeve.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a vertical section of the assembled anchor assembly of FIG. 1, depicted as being inserted to the top of a borehole drilled in a rock formation.

FIG. 4 is a view substantially identical to FIG. 3 with the addition of the upper threaded end portion of an elongated bolt being inserted into the inner threaded cylindrical section of the inner sleeve and the inner sleeve clamping around the threaded end portion of the elongated bolt.

FIG. 5 illustrates the anchor assembly shown in FIG. 4 after the elongated bolt has been partially withdrawn showing downward axial movement of the inner sleeve relative to the outer sleeve to expand the outer sleeve and thereby gripping engagement of teeth on the outer surface of the outer sleeve with the sidewall of the borehole.

FIG. 6 is a sectional view taken along line 6—6 on FIG. 5 showing the location keys and location keyways on the inner and outer sleeves in mating relationship.

DETAILED DESCRIPTION OF THE INVENTION

Figure 1:
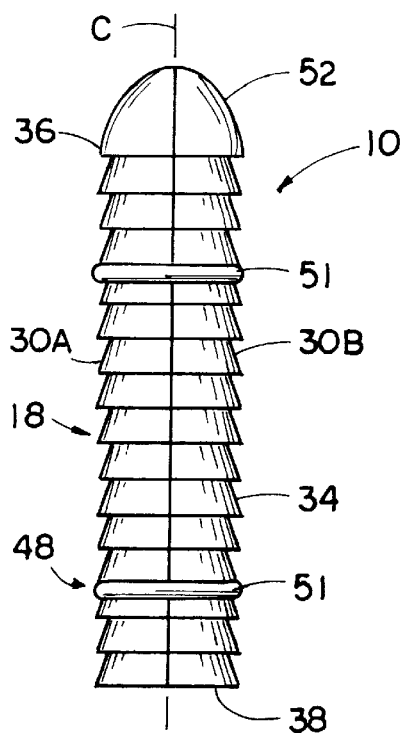
FIG. 1 is an elevational view of the expansion anchor assembly constructed in accordance with the principles of the present invention.
Figure 2:
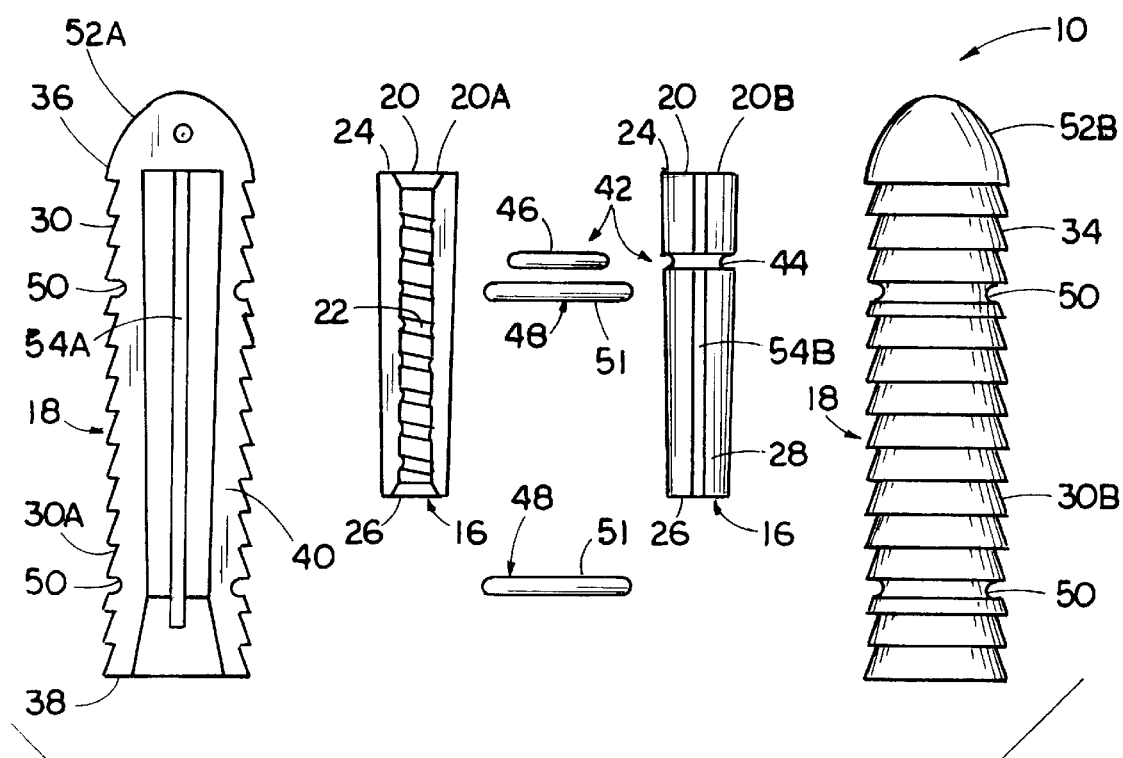
FIG. 2 is an exploded view of the anchor assembly seen in FIG. 1 showing the components of the outer sleeve, the inner sleeve, and the yieldable retaining means.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1–5, there is shown an expandable anchor assembly, generally indicated by the numeral 10 and being constructed in accordance with the principles of the present invention, which is to be inserted in a borehole B drilled in a rock formation F, such as illustrated in FIG. 3, to anchor within the borehole B a threaded end portion 12 of an elongated roof bolt 14 extending into the borehole B. The anchor assembly 10 basically includes a hollow inner expander sleeve 16 disposed within a hollow outer sleeve 18, with the inner expander sleeve 16 being operable to radially expand over and clamp around the threaded end portion 12 of the elongated bolt 14, as illustrated in FIG. 4, and operable to axially move within the outer sleeve 18 and with the bolt 14, relative to the borehole B, as the bolt 14 is partially withdrawn from the borehole B to thereby cause radial expansion of the outer sleeve 18 and engagement thereof with the sidewall S of the borehole B to anchor the threaded end portion 12 of the bolt 14 within the borehole B as illustrated in FIG. 5.

The hollow inner expander sleeve 16 includes a wall 20 with an inner threaded cylindrical section 22. The inner sleeve wall 20 decreases in thickness from a leading end 24 to a trailing end 26 of the inner sleeve 16 to provide an outer surface 28 tapering inwardly from the leading end 24 to the trailing end 26. The hollow outer sleeve 18 includes a wall 30 with a cylindrical outer surface 32 having gripping teeth 34 provided thereon. The outer sleeve wall 30 increases in thickness from a leading end 36 to a trailing end 38 of the outer sleeve 18 to provide an inner surface 40 tapering inwardly from the leading end 36 to the trailing end 38. The tapering of the inwardly tapered surface 40 of the outer sleeve 18 is the reverse of the tapering of the outwardly tapered surface 28 of the inner sleeve 16 such that the inner surface 40 of the outer sleeve 18 and the outer surface 28 of the inner sleeve 16 slide over one another as the inner sleeve 16 axially moves relative to the outer sleeve 18 from the leading end 36 toward the trailing end 38 of the outer sleeve 18. With the inner expander sleeve 16 so disposed within the outer sleeve 18, the inwardly tapered surface 40 of the outer sleeve 18 overlies the outwardly tapered outer surface 28 of the inner sleeve 16. Once the threaded end portion 12 of the elongated bolt 14 is inserted into the inner threaded cylindrical section 22 of the inner sleeve 16 from the trailing end 26 to the leading end 24 thereof such that the inner sleeve 16 has expanded over and clamped around the threaded end portion 12 of the elongated bolt 14, as illustrated in FIG. 4, then thereafter at least the partial withdrawal of the elongated bolt 14 from the borehole B causes the inner sleeve 16 to axially move in a sliding fashion relative to the outer sleeve 18 from the leading end 36 toward the trailing end 38 of the outer sleeve 18 to cause a wedging action between the outer surface 28 of the inner sleeve 16 and the inner surface 40 of the outer sleeve 18 to thereby force radial expansion of the outer sleeve 18 and engagement of the gripping teeth 34 of the outer sleeve 18 with the sidewall S of the borehole B for securing the expandable anchor assembly 10 and therewith the threaded end portion 12 of the elongated bolt 14 within the borehole B.

In the preferred embodiment, the inner expander sleeve 16 of the expandable anchor assembly 10 includes a plurality of longitudinal segmented wall portions 20A, 20B symmetrically arranged about a longitudinally extending central axis C in defining the inner threaded cylindrical section 22. More particularly, the plurality of longitudinal wall portions 20A, 20B is a pair of arcuate-shaped wall portions 20A, 20B with each wall portion being curved inwardly toward the central axis and with each one of the pair facing toward one another. Preferably, each inner sleeve wall portion 20A, 20B of the pair is composed of a high-strength plastic material and has a configuration of a truncated cone cut in half lengthwise. The inner sleeve 16 further includes means 42 for yieldably retaining the plurality of longitudinal segmented wall portions 20A, 20B such that the inner sleeve 16, in response to insertion of the threaded end portion 12 of the elongated bolt 14 into the inner threaded cylindrical section 22, radially expands over and clamps around the threaded end portion 14 of the elongated bolt 12 and is movable axially with the bolt 12 relative to the borehole B. Preferably, the means 42 for yieldably retaining the plurality of inner sleeve segmented wall portions 20A, 20B takes the form of a circumferential groove 44 provided in the outer surface 28 of the inner sleeve wall portions 20A, 20B and a passive restraining device, such as an O-ring 46, of a yieldable material surrounding the plurality of segmented wall portions 20A, 20B and disposed in the circumferential groove 44. As can be appreciated, rather than an O-ring, the passive restraining device could be in the form of a rubber band, a snap ring, or other similar such device.

Further, in the preferred embodiment, the outer sleeve 18 of the expandable anchor assembly 10 includes a plurality of longitudinal segmented wall portions 30A, 30B symmetrically arranged about the longitudinally extending central axis C. More particularly, the plurality of outer sleeve segmented wall portions 30A, 30B is a pair of arcuate-shaped wall portions 30A, 30B with each wall portion being curved inwardly toward the central axis C and with each one of the pair facing toward one another so as to form the cylindrical configuration of the outer sleeve 18. Preferably, each outer sleeve wall portion 30A, 30B of the pair is composed of a high-strength plastic material and has a configuration of a one-half cylinder. The outer sleeve 18 further includes means 48 for yieldably retaining the plurality of longitudinal segmented wall portions 30A, 30B such that the outer sleeve 18 retains and captures the inner expander sleeve 16 therewithin as the expandable anchor assembly 10 is inserted into the borehole B but permits the segmented wall portions 30A, 30B to expand radially outwardly from the central axis C to cause the gripping teeth 34 on the outer surface 32 of the outer sleeve 30 to engage the sidewall S of the borehole B as the inner sleeve 16 moves axially within the outer sleeve 18 as the elongated bolt 14 is partially withdrawn from the borehole B. Preferably, the means 48 for yieldably retaining the plurality of outer sleeve segmented wall portions 30A, 30B takes the form of at least one and preferably two circumferential grooves 50 provided in the outer surface 32 of the outer sleeve wall portions 30A, 30B and a passive restraining device, such as a pair of corresponding O-rings 51, of a yieldable material surrounding the plurality of segmented wall portions 30A, 30B and disposed in the circumferential grooves 50. As discussed above, rather than O-rings, rubber bands, snap rings, or other similar devices could be used. Furthermore, the O-rings 51 are a little oversize so as to increase the outer diameter of the outer sleeve 18 to assist in initially getting the anchor assembly 10 stuck in the borehole. This is the main reason for using two such O-rings in the preferred embodiment.

The anchor assembly 10 further includes a domed nose 52 formed on the leading end 36 of the outer sleeve 18 so as to provide a bullet-shaped configuration for the expandable anchor assembly 10 to guide and center the assembly 10 within the borehole B upon insertion thereof. In the preferred embodiment illustrated the dome nose 52 takes on the form of a corresponding pair of matching half-dome structures 52A, 52B, each being formed as an upper extension on the leading end 36 of a respective one of the pair of outer sleeve wall portions 30A, 30B. As can be appreciated by those skilled in the art, the addition of the dome nose 52 to present a bullet-shaped configuration, compared to a flat nose on prior art anchors, simplifies the insertion of the anchor assembly 10 into the borehole by allowing the assembly to be inserted without the need for extremely accurate positioning. It will also be noted that the trailing end of both the outer sleeve 18 and the inner sleeve 16 of the anchor assembly 10 is flared to present a funnel shaped configuration to assist in the insertion of the threaded end portion 12 of the elongated bolt 14 into the anchor assembly 10 within the borehole B. Also, to prevent shear movement of the outer sleeve wall portions 30A, 30B relative to one another, a short horizontal stub shaft has been provided on the flat face portion of one of the half-dome nose structures 52A, 52B which registers with a corresponding aperture provided on the opposing flat face portion of the other one of the half-dome nose structures 52A, 52B.

Still further, the anchor assembly 10 of the present invention further includes locator means 54 operably associated with the respective inner and outer sleeves 16, 18 for annular location of the inner sleeve 16 within the outer sleeve 18 and to prevent rotation of the inner sleeve 16 relative to the outer sleeve 18 as the inner sleeve 16 is axially moved relative to the outer sleeve 18 to cause radial expansion of the outer sleeve 18 and thereby gripping engagement of the gripping teeth 34 against the sidewall S of the borehole B. As best seen in FIGS. 2–6, and especially FIG. 6, the locator means 54 of the preferred embodiment includes a plurality of location keys 54A provided on either the outer surface 28 of the inner sleeve wall portions 20A, 20B or on the inner surface 40 of the outer sleeve wall portions 30A, 30B and a corresponding plurality of location keyways 54B provided on the other one of either the outer surface 28 of the inner sleeve wall portions 28 or the inner surface 40 of the outer sleeve wall portions 30A, 30B. The location keyways 54B are designed to mate with the location keys 54A so as to annularly locate the inner sleeve wall portions 20A, 20B relative to the outer sleeve wall portions 30A, 30B and to prevent the inner sleeve wall portions 20A, 20B from rotating relative to the outer sleeve wall portions 30A, 30B so as to ensure that corresponding wall portions 20A, 20B and 30A, 30B mate with one another and maintain such mating relationship as the inner sleeve wall portions 20A, 20B move axially relative to the outer sleeve wall portions 30A, 30B during the radial expansion operation as explained earlier.

Figure 7:
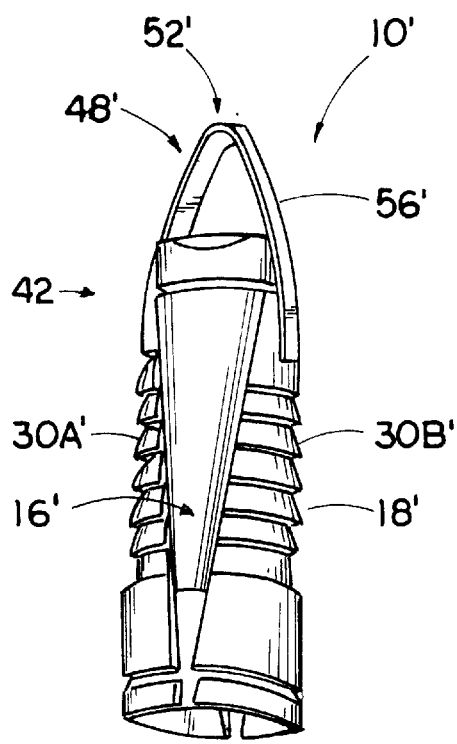
FIG. 7 is a perspective view of an alternative embodiment of the anchor assembly of the present invention shown as being assembled.
Figure 8:
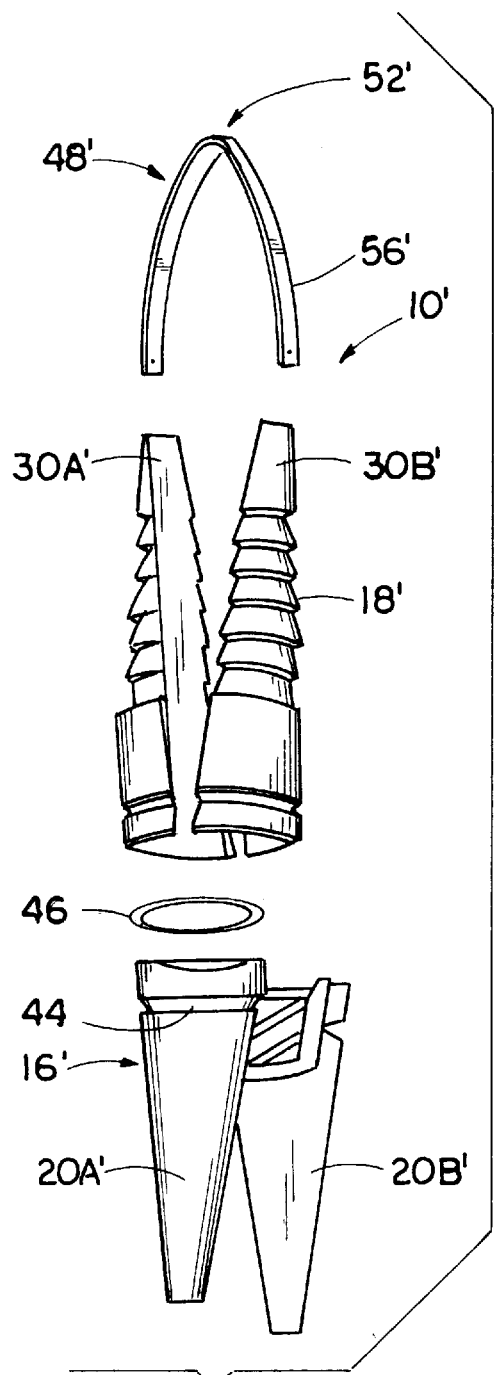
FIG. 8 is an exploded view of the alternative embodiment seen in FIG. 7.

An alternative embodiment of the expansion anchor assembly, indicated generally by the numeral 10' and constructed in accordance with the principles of the present invention, is shown in an assembled perspective view in FIG. 7 and in an exploded view in FIG. 8. In that this alternative embodiment is substantially identical to the preferred embodiment and it operates on the same principles, corresponding parts have been labelled with the same numerals except they contain a prime (') designation. Accordingly, only a brief description of the components of the alternative anchor assembly 10' will be given with emphasis being placed only in the differences of the structures.

In the anchor assembly 10', the outer sleeve 18' includes a pair of crescent-shaped wedges 30A', 30B', preferably composed of cast iron material rather than plastic, and the yieldable retaining means 48' is in the form of a U-shape strip of material 56, being composed of mild spring steel, which replaces the circumferential groove 50 and the O-ring 51 of assembly 10. Each outer sleeve wall portion wedge 30A', 30B' is attached to an opposite end of the strip of material 56 which is disposed in an inverted fashion to simulate a dome nose 52' so as to provide the bullet-shaped configuration for the expandable anchor assembly 10' to guide and center the assembly 10' within the borehole B as discussed earlier. And the inner sleeve 16' includes a pair of half-cylindrical wedges 20A', 20B', preferably composed of cast iron material rather than plastic. The remaining components of anchor assembly 10' are described with the same reference numerals of anchor assembly 10 and shall not be repeated.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. An expandable anchor assembly for insertion in a borehole drilled in a rock formation to anchor within the borehole a threaded end portion of an elongated bolt extending into the borehole, said anchoring assembly comprising:

(a) a hollow inner expander sleeve having a wall with an inner threaded cylindrical section, said wall decreasing in thickness from a leading end to a trailing end of said inner sleeve to provide an outer surface tapering outwardly from said leading end to said trailing end, said inner sleeve in response to insertion of the threaded end portion of the elongated bolt into said inner treaded cylindrical section of said inner sleeve being operable to radially expand over and clamp around the threaded end portion of the elongated bolt such that said inner sleeve is axially movable with the bolt relative to the borehole; and (b) a hollow outer sleeve having a cylindrical outer surface and a wall increasing in thickness from a leading end to a trailing end of said sleeve to provide an inner surface tapering inwardly from said leading end to said trailing end, said outer sleeve having gripping teeth provided on said outer cylindrical surface of said outer sleeve, a plurality of longitudinal segmented wall portions symmetrically arranged about a longitudinally extending central axis and means for yieldably retaining said plurality of longitudinal segmented wall portions such that said outer sleeve retains and captures said inner expander sleeve therewithin as said expandable anchor assembly is inserted into the borehole but permits said segmented wall portions to expand radially outwardly from said central axis, said inner expander sleeve being disposed within said outer sleeve with said inwardly tapered inner surface of said outer sleeve overlying said outwardly tapered outer surface of said inner sleeve and said inner sleeve being axially moveable relative to said outer sleeve, said outer sleeve in response to axial movement of said inner sleeve from said leading end toward said trailing end of said outer sleeve being operable to expand radially outwardly causing said gripping teeth thereon to grip a sidewall of the borehole;

whereby once the threaded end portion of the elongated bolt is inserted into said inner threaded cylindrical section of said inner sleeve from said trailing end to said leading end thereof such that said inner sleeve has expanded over and clamped around the threaded end portion of the elongated bolt, then thereafter at least the partial withdrawal of the elongated bolt from the borehole causes the inner sleeve to axially move relative to said outer sleeve from said leading end toward said trailing end of said outer sleeve and thereby cause radial expansion of said outer sleeve and engagement of said gripping teeth of said outer sleeve with the sidewall of the borehole to thereby secure said expandable anchor assembly and therewith the threaded end portion of the elongated bolt within the borehole.

2. The expandable anchor assembly as recited in claim 1, wherein said means for yieldably retaining said plurality of outer sleeve segmented wall portions includes a circumferential groove provided in said outer surface of said outer sleeve wall portions and an O-ring of a yieldable material surrounding said plurality of segmented wall portions and disposed in said circumferential groove.

3. The expandable anchor assembly as recited in claim 1, wherein said plurality of outer sleeve segmented wall portions is a pair of arcuate-shaped wall portions with each wall portion being curved inwardly toward said central axis and with each one of said pair facing toward one another so as to form the cylindrical configuration of said outer sleeve.

4. The expandable anchor assembly as recited in claim 3, wherein each outer sleeve wall portion of said pair is composed of a plastic material and has a configuration of a half-cylinder.

5. The expandable anchor assembly as recited in claim 3, wherein:

each outer sleeve wall portion of said pair is composed of cast iron and has a configuration of a crescent-shaped wedge; and said yieldable retaining means is in the form of a strip of material composed of mild spring steel, each outer sleeve wall portion wedge being attached to an opposite end of said strip of material, said strip of material having an inverted U-shape so as to provide a bullet-shaped configuration for said expandable anchor assembly to guide and center said assembly within the borehole during insertion thereof.

6. The expandable anchor assembly as recited in claim 1, further comprising a domed nose formed on the leading end of said outer sleeve so as to provide a bullet-shaped configuration for said expandable anchor assembly to guide and center said assembly within the borehole during insertion thereof.

7. The expandable anchor assembly as recited in claim 1, wherein the tapering of said inwardly tapered surface of said outer sleeve is the reverse of the tapering of said inwardly tapered surface of said inner sleeve such that said inner surface of said outer sleeve and said outer surface of said inner sleeve slide over one another as said inner sleeve axially moves relative to said outer sleeve from said leading end toward said trailing end of said outer sleeve as the elongated bolt is partially withdrawn from the borehole to cause a wedging action between said outer surface of said inner sleeve and said inner surface of said outer sleeve to force radial outward expansion of said outer sleeve and thereby gripping engagement of said gripping teeth on the outer surface of said outer sleeve against the sidewall of the borehole.

8. The expandable anchor assembly as recited in claim 1, wherein said inner sleeve includes:

a plurality of longitudinal segmented wall portions symmetrically arranged about a longitudinally extending central axis in defining said inner threaded cylindrical section; and means for yieldably retaining said plurality of longitudinal segmented wall portions such that said inner sleeve in response to insertion of the threaded end portion of the elongated bolt into said inner threaded cylindrical section radially expands over and clamps around the threaded end portion of the elongated bolt is movable axially with the bolt relative to the borehole.

9. The expandable anchor assembly as recited in claim 8, wherein said means for yieldably retaining said plurality of inner sleeve segmented wall portions includes a circumferential groove provided in said outer surface of said inner sleeve wall portions and an O-ring of a yieldable material surrounding said plurality of segmented wall portions and disposed in said circumferential groove.

10. The expandable anchor assembly as recited in claim 8, wherein said plurality of segmented inner sleeve wall portions is a pair of arcuate-shaped wall portions with each wall portion being curved inwardly toward said central axis and with each one of said pair facing toward one another so as to form the cylindrical configuration of said inner sleeve.

11. The expandable anchor assembly as recited in claim 10, wherein each inner sleeve wall portion of said pair is composed of plastic material and has a configuration of a truncated cone cut in half lengthwise.

12. The expandable anchor assembly as recited in claim 10, wherein each inner sleeve wall portion is composed of cast iron and has a configuration of a cylindrical wedge cut in half lengthwise with a dome at the leading end thereof.

13. The expandable anchor assembly as recited in claim 1, further comprising locator means operably associated with said inner and outer sleeves for annular location of said inner sleeve within said outer sleeve and to prevent rotation of said inner sleeve relative to said outer sleeve as said inner sleeve is axially moved relative to said outer sleeve to cause radial expansion of said outer sleeve and thereby gripping engagement of said gripping teeth against the sidewall of the borehole.

14. The expandable anchor assembly as recited in claim 13, wherein said locator means includes:

a location key provided on one of said outer surface of said inner sleeve and said inner surface of said outer sleeve; and a corresponding location keyway provided on the other one of said outer surface of said inner sleeve and said inner surface of said outer sleeve;

said location key mating with said location keyway so as to annularly locate said inner sleeve relative to said outer sleeve and to prevent said inner sleeve from rotating relative to said outer sleeve as said inner sleeve moves axially relative to said outer sleeve to radially expand said outer sleeve.

* * * * *